(12) United States Patent
Penwell et al.

(10) Patent No.: US 8,027,136 B2
(45) Date of Patent: Sep. 27, 2011

(54) SURGE SUPPRESSION DEVICE HAVING ONE OR MORE RINGS

(75) Inventors: Chris Penwell, Minden, NV (US); Jonathan L. Jones, Minden, NV (US); Bogdan B. Klobassa, Reno, NV (US)

(73) Assignee: Transtector Systems, Inc., Hayden, ID (US)

(*) Notice: Subject to any disclaimer, the term of this patent is extended or adjusted under 35 U.S.C. 154(b) by 235 days.

(21) Appl. No.: 12/254,760

(22) Filed: Oct. 20, 2008

(65) Prior Publication Data

US 2009/0103226 A1 Apr. 23, 2009

Related U.S. Application Data

(60) Provisional application No. 60/981,028, filed on Oct. 18, 2007.

(51) Int. Cl.
*H02H 1/04* (2006.01)

(52) U.S. Cl. ....................................................... 361/119

(58) Field of Classification Search .................. 361/119
See application file for complete search history.

(56) References Cited

U.S. PATENT DOCUMENTS

| | | | |
|---|---|---|---|
| 2,030,179 | A | 2/1936 | Potter |
| 3,167,729 | A | 1/1965 | Hall |
| 3,323,083 | A | 5/1967 | Ziegler |
| 3,619,721 | A | 11/1971 | Westendorp |
| 3,663,901 | A | 5/1972 | Forney, Jr. |
| 3,731,234 | A | 5/1973 | Collins |
| 3,750,053 | A | 7/1973 | LeDonne |
| 3,783,178 | A | 1/1974 | Philibert |
| 3,831,110 | A | 8/1974 | Eastman |
| 3,845,358 | A | 10/1974 | Anderson et al. |
| 3,944,937 | A | 3/1976 | Fujisawa et al. |
| 3,980,976 | A | 9/1976 | Tadama et al. |
| 4,046,451 | A | 9/1977 | Juds et al. |
| 4,047,120 | A | 9/1977 | Lord et al. |
| 4,112,395 | A | 9/1978 | Seward |
| 4,262,317 | A | 4/1981 | Baumbach |
| 4,359,764 | A | 11/1982 | Block |
| 4,384,331 | A | 5/1983 | Fukuhara et al. |
| 4,409,637 | A | 10/1983 | Block |
| 4,481,641 | A | 11/1984 | Gable et al. |
| 4,554,608 | A | 11/1985 | Block |

(Continued)

FOREIGN PATENT DOCUMENTS

CH 675933 A5 11/1990

(Continued)

OTHER PUBLICATIONS

PCT/US03/17050 ISR, May 30, 3003, PCT/WIPO.

*Primary Examiner* — Rexford Barnie
*Assistant Examiner* — Ann Hoang
(74) *Attorney, Agent, or Firm* — Snell & Wilmer L.L.P.

(57) ABSTRACT

A surge suppression device may include a housing having a cavity, a center conductor positioned within the cavity, a spiral inductor having an inner curve coupled to the center conductor and an outer curve, a coil capture device connected to the outer curve of the spiral inductor, and a ring assembly having a first ring connected to the coil capture device, a second ring connected to the housing, and a voltage limiting device positioned between the first ring and the second ring.

20 Claims, 4 Drawing Sheets

U.S. PATENT DOCUMENTS

| | | | | |
|---|---|---|---|---|
| 4,563,720 | A | 1/1986 | Clark | |
| 4,586,104 | A | 4/1986 | Standler | |
| 4,689,713 | A | 8/1987 | Hourtane et al. | |
| 4,698,721 | A | 10/1987 | Warren | |
| 4,727,350 | A | 2/1988 | Ohkubo | |
| 4,952,173 | A | 8/1990 | Peronnet et al. | |
| 4,984,146 | A | 1/1991 | Black et al. | |
| 4,985,800 | A | 1/1991 | Feldman et al. | |
| 5,053,910 | A | 10/1991 | Goldstein | |
| 5,057,964 | A | 10/1991 | Bender et al. | |
| 5,102,818 | A * | 4/1992 | Paschke et al. | 438/15 |
| 5,122,921 | A | 6/1992 | Koss | |
| 5,124,873 | A | 6/1992 | Wheeler et al. | |
| 5,142,429 | A | 8/1992 | Jaki | |
| 5,166,855 | A | 11/1992 | Turner | |
| 5,278,720 | A | 1/1994 | Bird | |
| 5,321,573 | A | 6/1994 | Person et al. | |
| 5,353,189 | A | 10/1994 | Tomlinson | |
| 5,442,330 | A | 8/1995 | Fuller et al. | |
| 5,537,044 | A | 7/1996 | Stahl | |
| 5,617,284 | A | 4/1997 | Paradise | |
| 5,625,521 | A | 4/1997 | Luu | |
| 5,667,298 | A | 9/1997 | Musil et al. | |
| 5,721,662 | A | 2/1998 | Glaser et al. | |
| 5,781,844 | A | 7/1998 | Spriester et al. | |
| 5,790,361 | A | 8/1998 | Minich | |
| 5,844,766 | A | 12/1998 | Miglioli et al. | |
| 5,854,730 | A | 12/1998 | Mitchell et al. | |
| 5,953,195 | A | 9/1999 | Pagliuca | |
| 5,966,283 | A | 10/1999 | Glaser et al. | |
| 5,982,602 | A | 11/1999 | Tellas et al. | |
| 5,986,869 | A | 11/1999 | Akdag | |
| 6,054,905 | A | 4/2000 | Gresko | |
| 6,060,182 | A | 5/2000 | Tanaka et al. | |
| 6,061,223 | A | 5/2000 | Jones et al. | |
| 6,086,544 | A | 7/2000 | Hibner et al. | |
| 6,115,227 | A | 9/2000 | Jones et al. | |
| 6,137,352 | A | 10/2000 | Germann | |
| 6,141,194 | A | 10/2000 | Maier | |
| 6,177,849 | B1 | 1/2001 | Barsellotti et al. | |
| 6,236,551 | B1 | 5/2001 | Jones et al. | |
| 6,243,247 | B1 | 6/2001 | Akdag et al. | |
| 6,252,755 | B1 | 6/2001 | Willer | |
| 6,281,690 | B1 | 8/2001 | Frey | |
| 6,292,344 | B1 | 9/2001 | Glaser et al. | |
| 6,342,998 | B1 | 1/2002 | Bencivenga et al. | |
| 6,385,030 | B1 | 5/2002 | Beene | |
| 6,421,220 | B2 | 7/2002 | Kobsa | |
| 6,721,155 | B2 | 4/2004 | Ryman | |
| 6,754,060 | B2 | 6/2004 | Kauffman | |
| 6,757,152 | B2 * | 6/2004 | Galvagni et al. | 361/306.3 |
| 6,785,110 | B2 | 8/2004 | Bartel et al. | |
| 6,975,496 | B2 | 12/2005 | Jones et al. | |
| 7,082,022 | B2 | 7/2006 | Bishop | |
| 7,106,572 | B1 * | 9/2006 | Girard | 361/118 |
| 7,130,103 | B2 | 10/2006 | Murata | |
| 7,159,236 | B2 | 1/2007 | Abe et al. | |
| 7,250,829 | B2 | 7/2007 | Namura | |
| 7,430,103 | B2 | 9/2008 | Kato | |
| 7,623,332 | B2 | 11/2009 | Frank et al. | |
| 7,808,752 | B2 | 10/2010 | Richiuso et al. | |
| 2003/0072121 | A1 | 4/2003 | Bartel et al. | |
| 2004/0264087 | A1 * | 12/2004 | Bishop | 361/91.1 |
| 2005/0036262 | A1 | 2/2005 | Siebenthall et al. | |
| 2007/0053130 | A1 | 3/2007 | Harwath | |
| 2007/0139850 | A1 | 6/2007 | Kamel et al. | |

FOREIGN PATENT DOCUMENTS

| | | |
|---|---|---|
| WO | WO 95/10116 | 4/1995 |
| WO | WO 9510116 | 4/1995 |

* cited by examiner

SURGE SUPPRESSION DEVICE HAVING ONE OR MORE RINGS

CROSS-REFERENCE TO RELATED APPLICATIONS

The present application for patent claims priority from and the benefit of provisional application Ser. No. 60/981,028 entitled "SURGE SUPPRESSION DEVICE HAVING ONE OR MORE RINGS," filed on Oct. 18, 2007, which is expressly incorporated by reference herein.

BACKGROUND

1. Field

The invention relates to surge suppression. More particularly, the invention relates to a surge suppression device having one or more rings.

2. Related Art

Communications equipment, such as cell towers, base stations, and mobile devices, are increasingly manufactured using small electronic components which are very vulnerable to damage from electrical surges. Surge variations in power and transmission line voltages, as well as noise, can change the frequency range of operation and can severely damage and/or destroy the communications equipment. Moreover, communications equipment can be very expensive to repair and replace.

There are many sources that can cause harmful electrical surges. One source is radio frequency (rf) interference that can be coupled to power and transmission lines from a multitude of sources. The power and transmission lines act as large antennas that may extend over several miles, thereby collecting a significant amount of rf noise power from such sources as radio broadcast antennas. Another harmful source is conductive noise, which is generated by communications equipment connected to the power and transmission lines and which is conducted along the power lines to the communications equipment to be protected. Still another source of harmful electrical surges is lightning. Lightning is a complex electromagnetic energy source having potentials estimated at from 5 million to 20 million volts and currents reaching thousands of amperes.

Many rf surge suppressors have been developed in the past to attenuate or block harmful electrical surges, power surges, and lightning strikes. These rf surge suppressors include electrical components such as capacitors, coils, gas tubes, and metal oxide varistors (MOVs). In order to achieve a consistent frequency range of operation, a low insertion loss, and a low voltage standing wave ratio (VSWR), the electrical components of these rf surge suppressors need to be manually tuned, which is imprecise and takes human labor to perform.

Ideally, what is needed is a rf and dc surge suppression device having a compact size, a low insertion loss, and a low VSWR that can protect hardware equipment from harmful electrical energy emitted from the above described sources.

SUMMARY

A surge suppression device may include a housing having a cavity, a center conductor positioned within the cavity, a spiral inductor having an inner curve coupled to the center conductor and an outer curve, a coil capture device connected to the outer curve of the spiral inductor, and a ring assembly having a first ring connected to the coil capture device, a second ring connected to the housing, and a voltage limiting device positioned between the first ring and the second ring.

A surge suppressor for passing dc currents and rf signals may include a housing, a center conductor positioned within the housing for passing dc currents and rf signals, and a spiral inductor having an inner curve coupled to the center conductor and an outer curve. The surge suppressor may also include a coil capture device connected to the outer curve of the spiral inductor, an insulating device positioned between the coil capture device and the housing, and a ring assembly having a first ring connected to the coil capture device, a second ring connected to the housing, and a voltage limiting device connected between the first ring and the second ring. The spiral inductor is positioned along a first plane and the ring assembly is positioned along a second plane where the first plane being substantially parallel to the second plane. The voltage limiting device may be selected from a group consisting of a diode, a gas tube, a metal oxide varistor, and combinations thereof.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements. In addition, the first digit of each reference number indicates the figure in which the element first appears.

Figure 1:
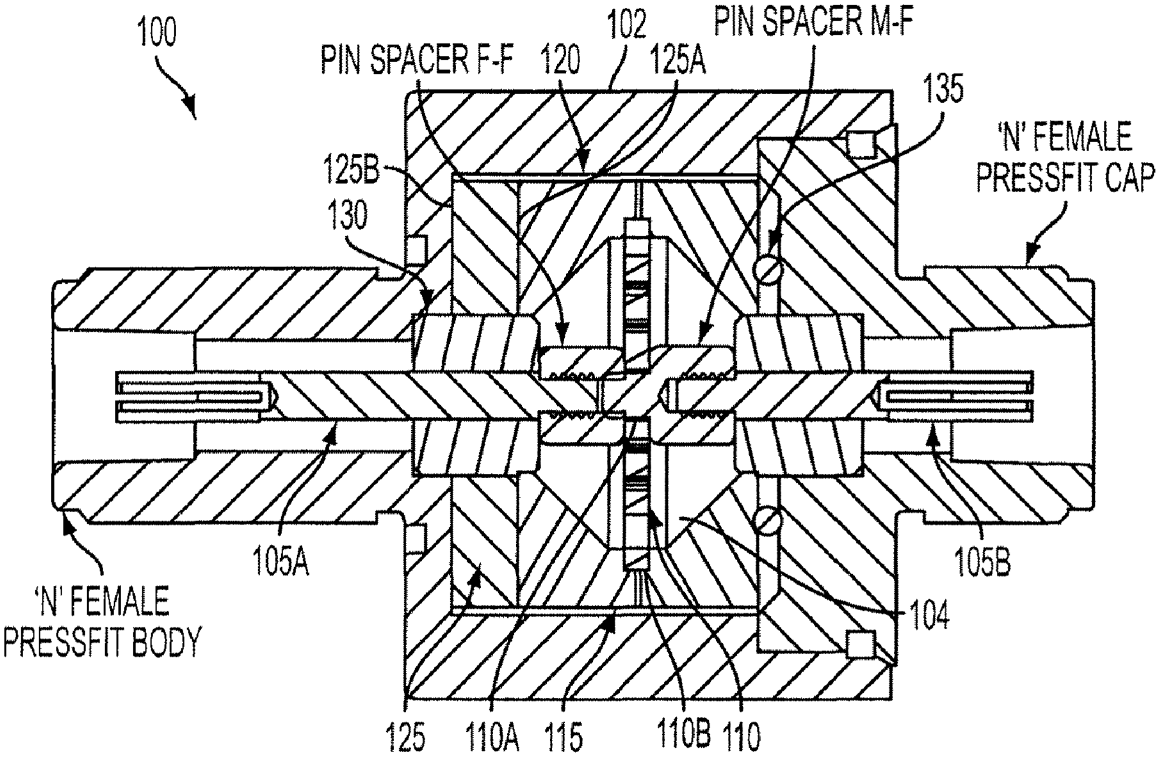
FIG. 1 is a cross-sectional view of a surge suppression device according to an embodiment of the invention.

FIG. 1 is a cross-sectional view of a surge suppression device 100 according to an embodiment of the invention. The surge suppression device 100 may include a housing 102 having a cavity 104, a center conductor 105A, 105B, a spiral inductor 110, a coil capture device 115, an insulating material 120 (e.g., a Teflon tape), a ring assembly 125, a dielectric material 130 (e.g., PTFE), and an insulating spacer 135 (e.g., O-ring). The center conductor 105A, 105B, the spiral inductor 110, the coil capture device 115, the insulating material 120, the ring assembly 125, the dielectric material 130, and the insulating spacer 135 may be positioned in the cavity 104 of the housing 102.

The surge suppression device 100 frequency performance for example may have a return loss of greater than or equal to 20 dB at 1.1 GHz to 1.6 GHz and an insertion loss of less than or equal to 0.2 dB at 1.1 GHz to 1.6 GHz. Another example is that the broadband frequency response may have a return loss of greater than or equal to 20 dB at 1.3 GHz to 2.4 GHz and an insertion loss of less than or equal to 0.2 dB at 1.3 GHz to 2.4 GHz.

The center conductor 105A, 105B may be a coaxial line where a center pin propagates the dc currents and the rf signals and an outer shield surrounds the center pin. The center conductor 105A may be centered within an outer shield such as a N female pressfit body and the center conductor 105B may be centered within an outer shield such as a N female pressfit cap. The center conductor 105A, 105B enables voltages and currents to flow through the surge suppression device 100. As long as the voltages are below the surge protection levels, currents will flow between center conductor 105A and center conductor 105B and the voltages at each end will be similar. The center conductor 105A, 105B also maintains the system rf impedance (e.g., 50 ohm, 75 ohm, etc.). The dc voltage on the center conductor 105A, 105B is used as the operating voltage to power electronic components that are coupled to the protected end of the surge suppression device 100.

The spiral inductor 110 has an inner ring 110A electrically coupled to the center conductor 105A, 105B and an outer ring 110B electrically coupled to the coil capture device 115. The spiral inductor 110 operates at a rf impedance to conduct the rf signals along the center conductor 105A, 105B during normal operation and to allow the rf signals to pass through the surge suppression device 100 with minimal or no rf insertion or signal loss. The rf impedance of the spiral inductor 110 is at least 10 times the operating impedance, i.e., 500 ohms for a 50 ohms system. In one embodiment, the spiral inductor 110 has an inner radius of approximately 62.5 mils and an outer radius of approximately 432.5 mils. Further details regarding the structure and functions of the housing 102, the center conductor 105A, 105B, and the spiral inductor 110 are discussed and shown in U.S. Pat. No. 6,061,223, which is assigned to the same assignee as the present application and is expressly incorporated by reference herein.

The coil capture device 115 may be positioned circumferentially around the spiral inductor 110 and/or the ring assembly 125. In one embodiment, the coil capture device 115 is a conductive sheet of material (e.g., foil or metal) that is formed in the shape of a cylinder. The coil capture device 115 may be made of an aluminum material (e.g., a 7075-T651 aluminum grade material). The coil capture device 115 is in physical and/or electrical contact with the outer ring 110B of the spiral inductor 110 and the ring assembly 125. Surge currents (i.e., ac or dc over voltage events) generally travel along the center conductor 105A, 105B, are diverted to the inner ring 110A, travel along the spiral inductor 110 to the outer ring 110B, and then travel from the outer ring 110B to the coil capture device 115.

The insulating material 120 is positioned between the coil capture device 115 and the housing 102. The insulating material 120 may be made of any insulating material. In one embodiment, a Teflon tape is used as the insulating material 120. The insulating material 120 isolates all dc and ac voltages from traveling along the coil capture device 115 from reaching or contacting the housing 102. When installed, the insulating material 120 may be formed in the shape of a cylinder or may take the shape of an inside portion of the housing 102. The insulating material 120 also provides an rf path to ground which is used for optimum frequency performance.

The ring assembly 125 has two substantially parallel rings and one or more voltage limiting devices (e.g., diodes, gas tubes and/or metal oxide varistors) positioned between the two substantially parallel rings. In various exemplary embodiments, 1, 2, 3, 4, 5, 6, 7 or 8 diodes, gas tubes and/or metal oxide varistors and combinations thereof may be used depending on the particular application. Each ring assembly 125 may have a thickness T1 of about 3.1 millimeters. The voltage limiting devices may have a thickness of T2 of about 0.5 millimeters.

Multiple ring assemblies 125 may be stacked adjacent to one another or spaced apart from one another within the housing 102. For example, a ring assembly including one or more diodes can be positioned adjacent to a ring assembly including one or more metal oxide varistors. In another example, one or more resistors, coils, inductors, and/or metal oxide varistors can be electrically connected between a first ring assembly and a second ring assembly. In one embodiment, a single ring assembly 125 may include a combination of one or more diodes, one or more gas tubes, and/or one or more metal oxide varistors to provide multiple levels of surge protection. The spiral inductor 110 may be positioned along a first plane and the ring assembly 125 may be positioned along a second plane that is substantially parallel to the first plane.

The rings may be made of a copper material or a tin-plated copper material. For illustrative purposes, rings 125A and 125B will be referred to as an inner ring 125A and an outer ring 125B, respectively. The inner ring 125A (i.e., the ring closer to the spiral inductor 110) is physically and/or electrically connected to the coil capture device 115 and the outer ring 125B (i.e., the ring further away from the spiral inductor 110) is physically and/or electrically connected to the housing 102 (e.g., a ground). In one embodiment, the inner ring 125A does not come into direct contact with the housing 102 but is rather spaced apart from the housing 102 using the insulating material 120. The outer ring 125B, however, is in direct contact with the housing 102, which acts as a ground. The surge passes through the voltage limiting devices when traveling from the inner ring 125A to the outer ring 125B. In one embodiment, the inner and outer rings 125A, 125B have an inner diameter ID of about 10.16 millimeters and an outer diameter OD of about 26.67 millimeters.

The surge travels from the coil capture device 115 to the inner ring 125A, across the one or more diodes, gas tubes and/or metal oxide varistors to the outer ring 125B, and then to the housing 102. The center conductor 105A passes through a hole 200 located in the center of the ring assembly 125. The ring assembly 125 does not directly contact the center conductor 105A but is physically spaced apart by the dielectric material 130. When the voltage on the center conductor 105A, 105B exceeds the voltage of the voltage limiting device, a path is created from the center conductor 105A, 105B to the housing 102 via the spiral inductor 110, the coil capture device 115, and the ring assembly 125.

The dielectric material 130 is positioned between the center conductor 105A and the ring assembly 125. The dielectric material 130 may be made of any insulating material. In one embodiment, a PTFE (e.g., Teflon) ring is used as the dielectric material 130. The dielectric material 130 isolates the signal traveling along the center conductor 105A, 105B from the surge traveling along the ring assembly 125 and vice versa. The insulating spacers 135 (e.g., O-Rings) are also used to create coaxial impedance between the center conductor 105A, 105B and the ring assembly 125. The insulating spacers 135 may be used to prevent voltages and currents from reaching the housing 102.

The inner ring 125A may be connected to the outer ring 125B via the one or more diodes. Each diode may be a silicon wafer diode that is positioned between the inner ring 125A and the outer ring 125B. Each diode may be bidirectional or unidirectional and may receive negative or positive surge pulses. The voltage across each diode is generally equally distributed. In one embodiment, each diode can handle about 6.5 volts and about 10,000 amps of current. In another embodiment, each diode can handle about 24 volts and about 3,000 amps of current. The diodes may be spaced an equal distance apart from each other around the rings of the ring assembly 125.

The inner ring 125A may be connected to the outer ring 125B via one or more gas tubes. Each gas tube may be bidirectional or unidirectional and may receive negative or positive surge pulses. The voltage across each gas tube is generally equally distributed. In one embodiment, each gas tube can turn on at around 90 volts and can handle about 10,000 amps of current. In another embodiment, each gas tube can turn on at around 180 volts and can handle about 10,000 amps of current. The gas tube may be spaced an equal distance apart from each other around the rings 125A, 125B of the ring assembly 125.

The inner ring 125A may be connected to the outer ring 125B via the one or more metal oxide varistors. Each varistor may be a silicon wafer varistor that is positioned between the inner ring 125A and the outer ring 125B. Each varistor may receive negative or positive surge pulses. The voltage across each varistor is generally equally distributed. In one embodiment, each varistor can turn on at around 35 volts and can handle about 5,000 amps of current. In another embodiment, each varistor can turn on at around 75 volts and can handle about 10,000 amps of current. The varistors may be spaced an equal distance apart from each other around the rings of the ring assembly 125.

Figure 2:
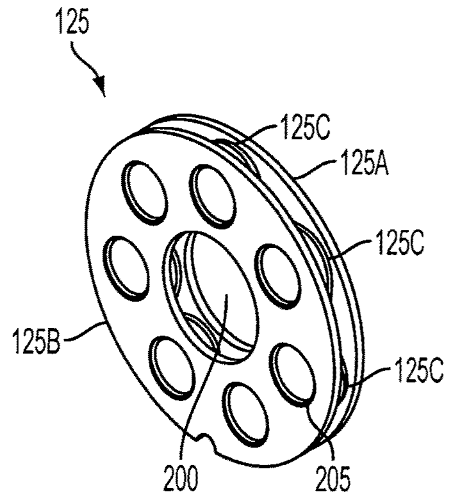
FIG. 2 is a perspective view of the ring assembly according to an embodiment of the invention.
Figure 3:
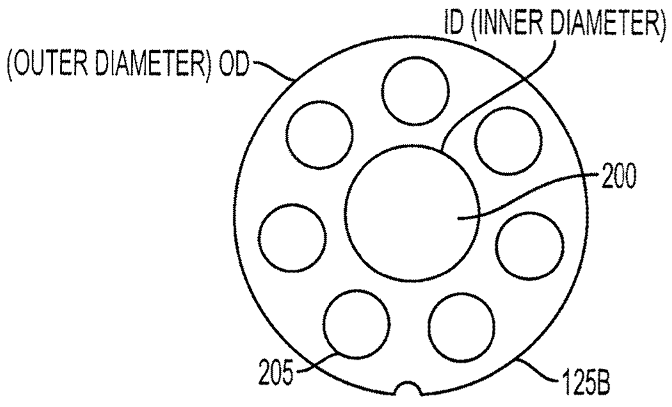
FIG. 3 is a front view of the ring assembly according to an embodiment of the invention.
Figure 4:
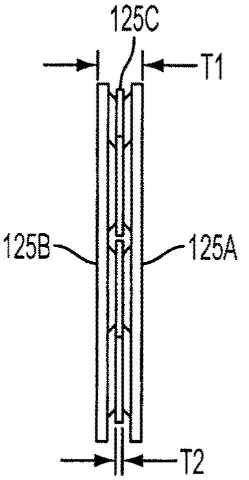
FIG. 4 is a side view of the ring assembly according to an embodiment of the invention.

FIG. 2 is a perspective view, FIG. 3 is a front view, and FIG. 4 is a side view of the ring assembly 125 according to an embodiment of the invention. The ring assembly 125 has a center hole or opening 200 for passage of the center conductor 105A. The voltage limiting devices 125C (e.g., one or more diodes, gas tubes and/or metal oxide varistors) are spaced an equi-distance apart and are positioned between the inner ring 125A and the outer ring 125B. As shown in FIG. 2, the inner ring 125A and the outer ring 125B are indented or punched in at the location of the voltage limiting devices 125C. Hence, each ring may have one or more indents 205 formed in the shape of a circle. Even though FIG. 2 shows 7 voltage limiting devices, a different number of voltage limiting devices may be used. The rf signals travel through the center opening 200 via the center conductor 105 and the surge travels along the outside of the rf current flow.

Figure 5:
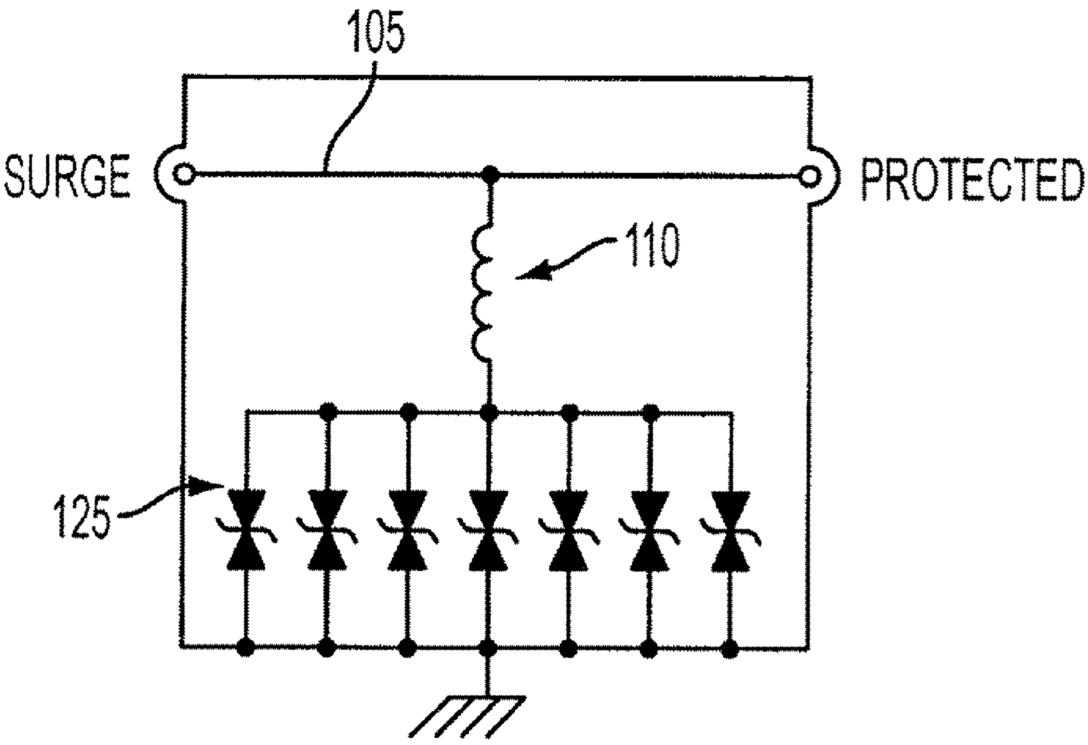
FIG. 5 is a schematic diagram of the surge suppression device of FIG. 1 according to an embodiment of the invention.

FIG. 5 is a schematic diagram of the surge suppression device 100 of FIG. 1 according to an embodiment of the invention. The surge suppression device 100 has 7 voltage limiting devices 125C positioned in a parallel electrical configuration. The surge travels along the center conductor 105, across the spiral inductor 110, across the voltage limiting devices 125C (in this example diodes) of the ring assembly 125, and to the ground.

Figure 6:
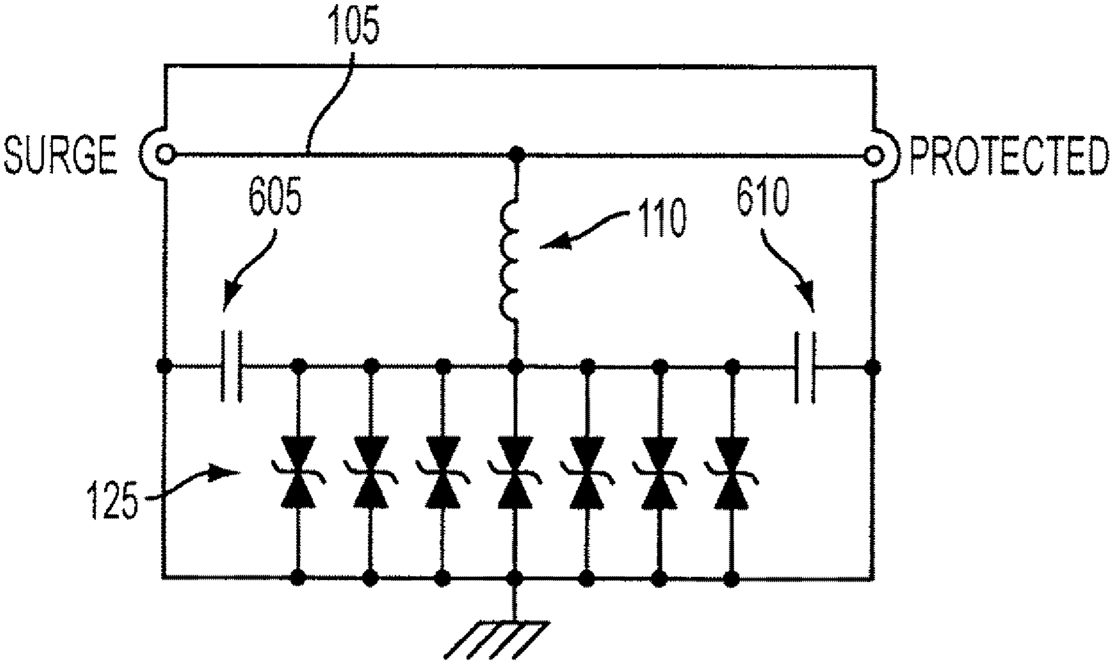
FIG. 6 is a schematic diagram of a surge suppression device of FIG. 1 according to an embodiment of the invention.

FIG. 6 is a schematic diagram of a surge suppression device 600 according to an embodiment of the invention. The surge suppression device 600 has 7 voltage limiting devices 125C positioned in a parallel electrical configuration. The surge travels along the center conductor 105, across the spiral inductor 110, across the voltage limiting devices 125C (in this example diodes) of the ring assembly 125, and to the ground. The surge suppression device 600 includes a first capacitor or capacitance 605 and a second capacitor or capacitance 610. The first capacitance 605 is the residual capacitance created by the ring assembly 125. The second capacitance 610 is the rf shunt capacitance created by the physical proximity of the coil capture device 115 to the housing 102.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A surge suppression device comprising:

a housing defining a cavity;

a spiral inductor having an inner curve and an outer curve;

a coil capture device connected to the outer curve of the spiral inductor;

a ring assembly defining an opening, the ring assembly having a first ring connected to the coil capture device, a second ring connected to the housing, and a voltage limiting device positioned between the first ring and the second ring; and a center conductor positioned within the cavity and coupled to the inner curve of the spiral inductor, the center conductor passing through the opening of the ring assembly.

2. The surge suppression device of claim 1 wherein the voltage limiting device is selected from a group consisting of a diode, a gas tube, a metal oxide varistor, and combinations thereof.

3. The surge suppression device of claim 2 wherein the diode can handle about 6.5 volts and about 10,000 amps of current.

4. The surge suppression device of claim 2 wherein the gas tube turns on at around 90 volts and can handle about 10,000 amps of current.

5. The surge suppression device of claim 2 wherein the metal oxide varistor turns on at around 35 volts and can handle about 5,000 amps of current.

6. The surge suppression device of claim 1 wherein the spiral inductor is positioned along a first plane and the ring assembly is positioned along a second plane, the first plane being substantially parallel to the second plane.

7. The surge suppression device of claim 1 wherein the first ring is positioned along a first plane and the second ring is positioned along a second plane, the first plane being substantially parallel to the second plane.

8. The surge suppression device of claim 1 further comprising an insulating device positioned between the coil capture device and the housing.

9. The surge suppression device of claim 1 wherein the center conductor is a coaxial line having a center pin that propagates dc currents and rf signals and an outer shield that surrounds the center pin.

10. The surge suppression device of claim 1 wherein the center conductor enables voltages and currents to flow across to an electronic component.

11. The surge suppression device of claim 1 wherein the coil capture device is positioned circumferentially around the center conductor.

12. The surge suppression device of claim 1 further comprising a plurality of voltage limiting devices, the voltage limiting devices being spaced an equal distance apart from each other around the ring assembly.

13. A surge suppressor for passing dc currents and rf signals comprising:

a housing;

a center conductor positioned within the housing for passing dc currents and rf signals;

a spiral inductor positioned within the housing and along a first plane, the spiral inductor having an inner curve coupled to the center conductor and an outer curve;

a coil capture device positioned circumferentially around the center conductor, the coil capture device connected to the outer curve of the spiral inductor;

an insulating device positioned between the coil capture device and the housing; and a ring assembly positioned within the housing and along a second plane that is substantially parallel to the first plane, the ring assembly defining an opening and having a first ring connected to the coil capture device, a second ring connected to the housing, and a voltage limiting device connected between the first ring and the second ring, wherein the voltage limiting device is selected from a group consisting of a diode, a gas tube, a metal oxide varistor, and combinations thereof and wherein the center conductor passes through the opening of the ring assembly.

14. The surge suppressor of claim 13 wherein the first ring is positioned along a first plane and the second ring is positioned along a second plane, the first plane being substantially parallel to the second plane.

15. The surge suppressor of claim 13 wherein the first ring is not connected to the housing.

16. The surge suppressor of claim 13 wherein the coil capture device is a conductive sheet of material that is formed in the shape of a cylinder.

17. The surge suppressor of claim 13 further comprising a dielectric material positioned between the center conductor and the ring assembly, the dielectric material isolating the rf signals traveling along the center conductor from a surge traveling through the ring assembly.

18. The surge suppressor of claim 13 wherein the diode is a silicon wafer diode.

19. The surge suppressor of claim 13 wherein the varistor is a silicon wafer varistor.

20. The surge suppressor of claim 13 wherein the first ring of the ring assembly or the second ring of the ring assembly is indented at a location of the voltage limiting device.

* * * * *